(12) United States Patent
Barnes et al.

(10) Patent No.: US 11,300,165 B2
(45) Date of Patent: Apr. 12, 2022

(54) ELECTROMAGNETICALLY-OPERATED COUPLING DEVICE

(71) Applicant: DANA GRAZIANO S.R.L., Rivoli (IT)

(72) Inventors: Robert John Barnes, Rivoli (IT); Benjamin Stubbs, Warwickshire (GB); Andrew Charles Osborne Smith, Rivoli (IT)

(73) Assignee: DANA GRAZIANO S.R.L., Rivoli (IT)

( * ) Notice: Subject to any disclaimer, the term of this patent is extended or adjusted under 35 U.S.C. 154(b) by 14 days.

(21) Appl. No.: 16/767,521

(22) PCT Filed: Nov. 28, 2018

(86) PCT No.: PCT/IB2018/059384
§ 371 (c)(1),
(2) Date: May 27, 2020

(87) PCT Pub. No.: WO2019/106551
PCT Pub. Date: Jun. 6, 2019

(65) Prior Publication Data
US 2020/0378453 A1 Dec. 3, 2020

(30) Foreign Application Priority Data

Nov. 28, 2017 (IT) .......................... 202017000136703
Aug. 9, 2018 (IT) .......................... 202018000003241

(51) Int. Cl.
*F16D 27/108* (2006.01)
*F16D 27/118* (2006.01)

(52) U.S. Cl.
CPC .......... *F16D 27/108* (2013.01); *F16D 27/118* (2013.01)

(58) Field of Classification Search
CPC ........................... F16D 27/108; F16D 27/118
See application file for complete search history.

(56) References Cited

U.S. PATENT DOCUMENTS

| 2003/0010144 A1 | 1/2003 | Petzold |
| 2003/0211913 A1 | 11/2003 | Spitale |

(Continued)

FOREIGN PATENT DOCUMENTS

| AT | 190752 B | 7/1957 |
| CA | 1231313 A | 1/1988 |

(Continued)

OTHER PUBLICATIONS

Translation of WO2018/230484 (Year: 2021).*

(Continued)

*Primary Examiner* — Stacey A Fluhart
(74) *Attorney, Agent, or Firm* — McCoy Russell LLP

(57) ABSTRACT

Electromagnetically-operated coupling device for selectively connecting and disconnecting a first rotating member and a second rotating member in a driveline of a vehicle is disclosed, wherein the first and the second rotating members are coaxial with each other and rotatable about a same axis of rotation. The coupling device comprises: an engagement sleeve provided with a control disk made of a ferromagnetic material, the engagement sleeve being axially slidable between an engaged position and a disengaged position; and a control system for controlling the sliding movement of the engagement sleeve between said engaged and disengaged positions. The control system comprises a pair of magnetic coils which are placed on opposite sides of the control disk, coaxially therewith, and are arranged to be selectively activated by an electric current to generate a magnetic force acting on the control disk to axially move the control disk, and therefore also the engagement sleeve, in either directions. The control system further comprises an elaboration (Continued)

unit for controlling activation and deactivation of the magnetic coils based on the axial position of the engagement sleeve.

11 Claims, 2 Drawing Sheets

(56) References Cited

U.S. PATENT DOCUMENTS

| | | |
|---|---|---|
| 2006/0207362 A1 | 9/2006 | Martin |
| 2009/0224728 A1 | 9/2009 | Tarasinski |
| 2017/0159726 A1* | 6/2017 | Creech ................... B60K 17/02 |

FOREIGN PATENT DOCUMENTS

| | | | | |
|---|---|---|---|---|
| CA | 2281864 A1 | | 3/2000 | |
| DE | DE-102015201854 A1 * | | 8/2016 | ............. H01F 7/081 |
| EP | 1357317 A2 | | 10/2003 | |
| EP | 1832773 A2 | | 9/2007 | |
| WO | WO-2008123621 A * | | 10/2008 | ............. F16D 27/118 |
| WO | WO-2018230484 A1 * | | 12/2018 | ............... B60H 1/32 |

OTHER PUBLICATIONS

China National Intellectual Property Administration, Office Action and Search Report Issued in Application No. 201880077097.2, dated May 28, 2021, 13 pages. (Submitted with Partial Translation).

ISA European Patent Office, International Search Repod Issued in Application No. PCT/IB2018/059384, dated May 9, 2019, WIPO, 4 pages.

ISA European Patent Office, Written Opinion of the International Searching Authority Issued in Application No. PCT/IB2018/059384, dated May 9, 2019, WIPO, 6 pages.

* cited by examiner

ELECTROMAGNETICALLY-OPERATED COUPLING DEVICE

CROSS-REFERENCE TO RELATED APPLICATIONS

The present application is a U.S. National Phase of International Patent Application Serial No. PCT/IB2018/059384, entitled "ELECTROMAGNETICALLY-OPERATED COUPLING DEVICE," filed on Nov. 28, 2018. International Patent Application Serial No. PCT/IB2018/059384 claims priority to Italian Patent Application No. 202017000136703, filed on Nov. 28, 2017, and claims priority to Italian Patent Application No. 202018000003241, filed on Aug. 9, 2018. The entire contents of each of the above-mentioned applications are hereby incorporated by reference in their entirety for all purposes.

TECHNICAL FIELD

The present invention relates in general to a coupling device for selectively connecting and disconnecting a first rotating member and a second rotating member in a driveline of a motor vehicle, and more specifically to an electromagnetically-operated coupling device.

BACKGROUND AND SUMMARY

A coupling device according to the preamble of independent claim 1 is known, for example, from AT 190 752.

Other electromagnetically-operated coupling devices are known, for example, from DE 10 2015 015 238 A1, U.S. Pat. No. 8,276,726 B2 and DE 10 2006 010 616 A1.

It is an object of the present invention to provide an improved coupling device with respect to the prior art.

This and other objects are achieved according to the present invention by virtue of a coupling device having the features defined in independent claim 1.

Advantageous embodiments of the invention are the subject-matter of the dependent claims, the content of which is to be intended as forming an integral part of the following description.

In short, the invention is based on the idea of providing a coupling device wherein the control system further comprises an elaboration unit for controlling the activation and deactivation of the magnetic coils based on the axial position of the engagement sleeve.

Preferably, the control system further comprises a position sensor arranged to sense the position of the engagement sleeve and generate a corresponding position signal, the position signal being sent to the elaboration unit for allowing the elaboration unit to control the activation and deactivation of the magnetic coils based on this signal. By virtue of the presence of a position sensor arranged to sense the position of the engagement sleeve and generate a corresponding position signal, the coupling device is able to quickly and precisely control the position of the engagement sleeve.

As an alternative to the use of a position sensor to provide the elaboration unit with information regarding the axial position of the engagement sleeve, it may also be envisaged that the elaboration unit estimates the axial position of the engagement sleeve based on the variation of an electromagnetic parameter of the coils, such as, for example, the inductance.

By virtue of the simple arrangement of its elements, a coupling device according to the invention can be manufactured with a modular approach, thereby leading to a reduction in the manufacturing and assembling costs.

In particular, the reduced number of elements of the coupling device allows for a decrease in maintenance time and cost.

BRIEF DESCRIPTION OF THE FIGURES

Further features and advantages of the present invention will become apparent from the following detailed description, given purely by way of non-limiting example with reference to the appended drawings, where.

DETAILED DESCRIPTION

With reference to the drawings, a driveline (only partially shown) of a vehicle includes a first rotating member 10 and a second rotating member 12 which are arranged coaxially with each other and are rotatably supported about an axis of rotation x. The first and second rotating members 10 and 12 may be shafts, wheels or any other rotating members of a vehicle driveline.

The driveline further includes an electromagnetically-operated coupling device, generally indicated 14, for connecting the first and second rotating members 10 and 12 with each other for rotation about the axis x, so as to allow transmission of a torque between the first and second rotating members 10 and 12.

Figure 1:
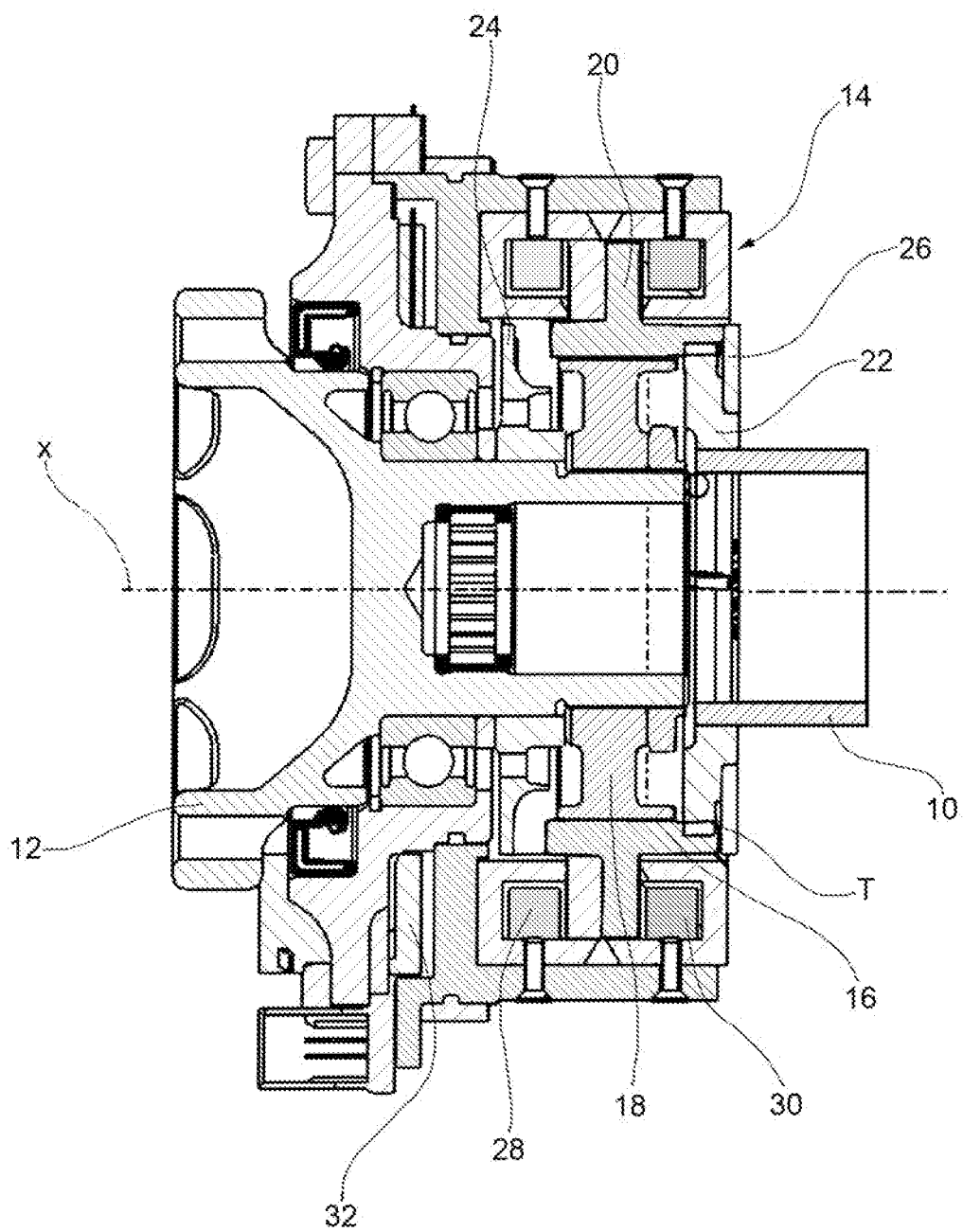
FIGS. 1 and 2 are axial section views of a coupling device according to an embodiment of the present invention, in an engaged position and in a disengaged position, respectively.
Figure 2:
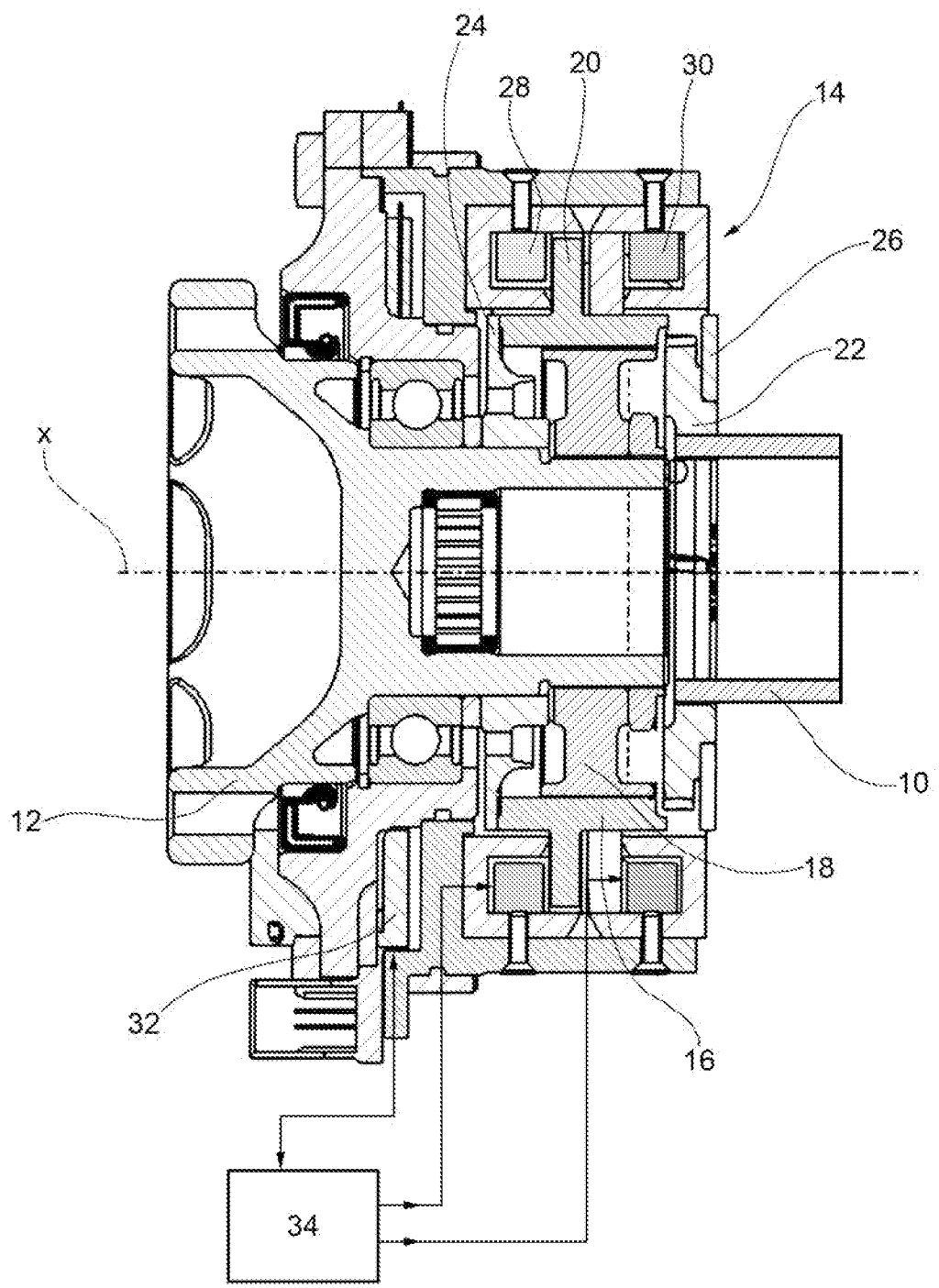

The coupling device 14 comprises an engagement sleeve 16 which is axially (i.e. along the direction of the axis x) slidable between an engaged position (FIG. 1) and a disengaged position (FIG. 2), and a control system for controlling the axial sliding movement of the engagement sleeve 16.

In the embodiment shown, the engagement sleeve 16 is mounted axially slidable on the second rotating member 12 and is drivingly connected for rotation therewith, for example by means of a splined connection. In particular, the engagement sleeve 16 is not mounted directly on the second rotating member 12, but it is mounted axially slidable on a hub 18, the hub 18 being fixed for rotation with the second rotating member 12. Nevertheless, the engagement sleeve 16 may also be mounted on the second rotating member 12 without any element therebetween.

The engagement sleeve 16 may be generally shaped as a short, hollow cylinder extending along the axis x. The engagement sleeve 16 may be made of steel, or any other suitable material.

The engagement sleeve 16 comprises a control disk 20 made of a ferromagnetic material. The control disk 20 is drivingly connected with the engagement sleeve 16 in the sliding movement along the axis x. The control disk 20 is shaped for example as a flange extending from the outer surface of the engagement sleeve 16 radially away from the axis x.

According to an embodiment, the engagement sleeve 16 may also be made of a ferromagnetic material. In this case, the control disk 20 is preferably made in one piece with the engagement sleeve 16.

The engagement sleeve 16 is arranged to cooperate in a per-se-known manner with an engagement ring 22 which is drivingly connected for rotation with the first rotating member 10, whereby in the engaged position the engagement sleeve 16 engages with the engagement ring 22 to be drivingly connected for rotation therewith, thereby allowing transmission of the torque between the first and second rotating members 10 and 12, whereas in the disengaged position the engagement sleeve 16 is disengaged from the engagement ring 22 and the first and second rotating members 10 and 12 are therefore free to rotate relative to each other about the axis x. The engagement ring 22 may, for example, be provided with outer teeth T meshing, in the engaged position, with inner teeth of the engagement sleeve 16.

The coupling device 14 may further comprise a first end-of-travel element 24 and a second end-of-travel element 26 placed on opposite sides of the control disk 20 to limit the axial displacement of the engagement sleeve 16.

The control system of the coupling device 14 comprises a pair of magnetic coils 28 and 30 placed substantially coaxially with the axis x on opposite sides of the control disk 20. The magnetic coils 28 and 30 are selectively activated by an electrical current to generate a magnetic force acting on the control disk 20 to move it axially in either directions.

More specifically, activation of the magnetic coil 28 results in a magnetic force directed to the right (according to the point of view of a person looking at FIGS. 1 and 2) being applied to the control disk 20, such that the latter is pulled towards the magnetic coil 28 and thus the engagement sleeve 16 is moved to the engaged position, whereas activation of the magnetic coil 30 results in a magnetic force directed to the left being applied to the control disk 20, such that the latter is pulled towards the magnetic coil 30 and thus the engagement sleeve 16 is moved to the disengaged position.

The magnetic coils 28 and 30 are preferably formed with glass-insulated wire, in order to avoid short circuits.

The control system further comprises a position sensor 32, which is arranged to sense the axial position of the engagement sleeve 16 and generate a corresponding position signal, and an elaboration unit 34, which is connected to the position sensor 32 and to the magnetic coils 28 and 30 and is arranged to receive the position signal generated by the position sensor 32 and bring about activation and deactivation of the magnetic coils 28 and 30.

The position sensor 32 may generally be a non-contact inductive position sensor. The 30 position signal generated by the position sensor 32 may describe the position of the engagement sleeve 16 when it is in the engagement position, in the disengagement position or in any other position in between.

The elaboration unit 34 may be arranged to activate and deactivate the magnetic coils 28 and 30 to control the position of the engagement sleeve 16, according to a programmable and updatable control strategy. Any known control strategy already used for controlling conventional hydraulic actuators may be implemented by the elaboration unit 34 for use in a coupling device 14 according to the present invention. Preferably, the elaboration unit 34 is arranged to control activation and deactivation of the magnetic coils 28 and 30 based on the position signal received from the position sensor 32.

By virtue of the simple arrangement of its elements, a coupling device according to the invention allows two rotating members of a vehicle driveline to be connected to each other and disconnected from each other without requiring heavy and expensive traditional hydraulically-operated coupling devices.

In particular, the electromagnetic actuation allows for a quick and precise control of the position of the engagement sleeve, while the use of a position sensor allows for a precise feedback about the axial displacement of the engagement sleeve.

Naturally, the principle of the invention remaining unchanged, the embodiments and constructional details may vary widely from those described and illustrated purely by way of non-limiting example, without thereby departing from the scope of the invention as defined in the enclosed claims.

For example, as mentioned in the introductory part of the description, the position sensor may be omitted and, in such a case, the axial position of the engagement sleeve is estimated by the elaboration unit based on the variation of an electromagnetic parameter of the coils, such as the inductance.

The invention claimed is:

1. A coupling device for selectively connecting and disconnecting a first rotating member and a second rotating member in a driveline of a vehicle, wherein the first and second rotating members are coaxial with each other and rotatable about a same axis of rotation, the coupling device comprising:
   an engagement sleeve provided with a control disk made of a ferromagnetic material, the engagement sleeve being axially slidable between an engaged position, wherein the engagement sleeve connects the first rotating member with the second rotating member so as to allow transmission of a torque between the first rotating member and the second rotating member through the engagement sleeve, and a disengaged position, wherein the engagement sleeve disconnects the first rotating member from the second rotating member; and
   a control system for controlling the sliding movement of the engagement sleeve between said engaged and disengaged positions, the control system comprising a pair of magnetic coils placed on opposite sides of the control disk, coaxially therewith, said pair of magnetic coils being arranged to be selectively activated by an electric current to generate a magnetic force acting on the control disk to axially move the control disk, and therefore also the engagement sleeve, in either direction;
   wherein the control system controls activation and deactivation of the pair of magnetic coils based on an axial position of the engagement sleeve;
   wherein the control disk is shaped as a flange extending directly from an outer surface of the engagement sleeve, radially away from a rotational axis, and between the pair of magnetic coils; and
   wherein the control disk and the engagement sleeve are formed as one continuous piece of material.

2. The coupling device according to claim 1, further comprising a position sensor for sensing the axial position of the engagement sleeve and sending a respective position signal to the control system, the control system controls activation and deactivation of the coils based on said position signal.

3. The coupling device according to claim 2, wherein the position sensor is a non-contact inductive position sensor.

4. The coupling device according to claim 1, wherein the control system estimates the axial position of the engagement sleeve based on the variation of an electromagnetic parameter of the coils.

5. The coupling device according to claim 4, wherein the electromagnetic parameter is inductance.

6. The coupling device according to claim 1, further comprising a first end-of-travel element and a second endof-travel element placed on opposite sides of the control disk to limit the axial displacement of the engagement sleeve.

7. The coupling device according to claim 1, further comprising an engagement ring connected on one side to the first rotating member, said engagement ring being arranged to connect the engagement sleeve with the first rotating member when the engagement sleeve is in the engaged position.

8. The coupling device according to claim 1, further comprising an internal hub, which is mounted on the second rotating member, coaxially therewith, and supports the engagement sleeve.

9. The coupling device according to claim 1, wherein the engagement sleeve is also made of a ferromagnetic material.

10. The coupling device according to claim 1, wherein the pair of magnetic coils are arranged in such a manner that, when an electric current flows through either of them, a magnetic force is generated on the control disk such that the control disk is axially moved towards the pair of magnetic coil through which the electric current is flowing.

11. A driveline of a vehicle comprising a first rotating member, a second rotating member, and a coupling device according to claim 1.

* * * * *